US009639916B2

(12) United States Patent
Kondou

(10) Patent No.: US 9,639,916 B2
(45) Date of Patent: May 2, 2017

(54) IMAGE PROCESSING DEVICE, AND IMAGE PROCESSING METHOD

(71) Applicant: NIPPON SYSTEMWARE CO., LTD., Tokyo (JP)

(72) Inventor: Tsuyoshi Kondou, Tokyo (JP)

(73) Assignee: NIPPON SYSTEMWARE CO., LTD., Tokyo (JP)

( * ) Notice: Subject to any disclaimer, the term of this patent is extended or adjusted under 35 U.S.C. 154(b) by 0 days.

(21) Appl. No.: 14/654,535

(22) PCT Filed: Jan. 15, 2014

(86) PCT No.: PCT/JP2014/050489
§ 371 (c)(1),
(2) Date: Jun. 21, 2015

(87) PCT Pub. No.: WO2015/075952
PCT Pub. Date: May 28, 2015

(65) Prior Publication Data
US 2015/0332437 A1    Nov. 19, 2015

(30) Foreign Application Priority Data

Nov. 25, 2013  (JP) ................................. 2013-242835

(51) Int. Cl.
*G06K 9/46*        (2006.01)
*G06T 5/00*        (2006.01)
(Continued)

(52) U.S. Cl.
CPC .................. *G06T 5/00* (2013.01); *G06K 9/46* (2013.01); *G06K 9/4661* (2013.01); *G06T 5/007* (2013.01);
(Continued)

(58) Field of Classification Search
None
See application file for complete search history.

(56) References Cited

U.S. PATENT DOCUMENTS

2010/0040300 A1* 2/2010 Kang ..................... G06T 5/003
382/255
2011/0188775 A1* 8/2011 Sun .......................... G06K 9/40
382/274

FOREIGN PATENT DOCUMENTS

JP        2011003048        1/2011
JP        2012221237        11/2012
(Continued)

OTHER PUBLICATIONS

Shinichiro Hirooka, et al. "Real-time Image Visibility Enhancement Technology under Bad Weather Condition for Video Cameras" IPSJ SIG Technical Report, Consumer Device & System (CDS), Sep. 5, 2013, vol. 2013-CDS-8, No. 1, p. 1-6.
(Continued)

*Primary Examiner* — Fred Hu
(74) *Attorney, Agent, or Firm* — Soroker Agmon Nordman

(57) ABSTRACT

A fog in an image is quickly removed with a small processing load.
An image processing device includes a dark channel image generating section 20 for generating a dark channel image based on an input image, a transmittance image generating section 30 for generating a transmittance image based on the dark channel image generated in the dark channel image generating section 20 and a pixel value of atmospheric light, a transmittance correcting section 40 for correcting the transmittance image generated in the transmittance image generating section 30, and a fog removal image generating section 60 for removing fog in the input image based on the
(Continued)

transmittance image corrected in the transmittance correcting section 40, the pixel value of atmospheric light, and the input image.

7 Claims, 7 Drawing Sheets

(51) Int. Cl.
　　　*H04N 1/409*　　　(2006.01)
　　　*G06T 5/40*　　　(2006.01)

(52) U.S. Cl.
　　　CPC ............. *G06T 5/40* (2013.01); *H04N 1/4092* (2013.01); *G06K 2009/4666* (2013.01); *G06T 2207/20016* (2013.01)

(56) References Cited

FOREIGN PATENT DOCUMENTS

| | | |
|---|---|---|
| JP | 2013058202 | 3/2013 |
| WO | 2013018101 | 2/2013 |
| WO | 2013029337 | 3/2013 |

OTHER PUBLICATIONS

Akira Mizuno, et at. "Local Adaptive High-Speed Single Image Dehazing" ITE Technical Report, May 21, 2012, vol. 36, No. 20, p. 9-12.

\* cited by examiner (A)

(B) 0 hierarchical layer (C) 1st hierarchical layer (D) 2nd hierarchical layer

IMAGE PROCESSING DEVICE, AND IMAGE PROCESSING METHOD

RELATED APPLICATIONS

The present application claims priority as a US national phase under 35 U.S.C. 363 of Application No. PCT/JP2014/050489 filed on Jan. 15, 2014, which claims priority to Japanese Patent Application No. 2013-242835 filed on Nov. 25, 2013, of which the disclosures are incorporated herein by reference and to which priority is claimed.

FIELD OF THE INVENTION

The present invention relates to an image processing device, an image processing method, and a control program for removing fog in an image.

BACKGROUND OF THE INVENTION

An image processing method for removing fog in an image is known, for example as described in non-patent document 1. In this image processing method, an image processing device corrects an input image by dividing the pixel value (R, G, and B) of each pixel of the input image by the pixel value (R, G, and B) of atmospheric light. In addition, the image processing device estimates a density of fog in the corrected input image using the minimum values of R, G, and B in a local region called a dark channel. Then, the image processing device calculates a rough transmittance from the density of fog. Furthermore, the image processing device calculates an accurate transmittance using a method called soft matting. The image processing device removes fog in an image using this transmittance.

Non-patent document 1: K. He, J. Sun and X. Tang, "Single Image Haze Removal Using Dark Channel Prior" CVPR, 2009

SUMMARY OF THE INVENTION

As described above, the image processing device obtains a dark channel in a local region. This local region is preferably a region regarded to have a fixed transmittance. However, in the method described in the aforementioned non-patent document 1, the local region is defined as a region having a predetermined size around the pixels for obtaining a dark channel. Therefore, the transmittance within the local region is not fixed but inconsistent. Accordingly, the image processing device performs a uniformizing processing by soft matting in the method described in the aforementioned non-patent document 1, however, a processing load of soft matting is large and thereby, it takes much processing time.

In view of the aforementioned circumstances, an object of the present invention is to provide an image processing device, an image processing method, and a control program for quickly removing fog in an image with a small processing load.

In order to achieve the above object, the present invention provides an image processing device including a dark channel image generating section for generating a dark channel image based on an input image, a transmittance image generating section for generating a transmittance image based on the dark channel image generated by the dark channel image generating section and a pixel value of atmospheric light, a transmittance correcting section for correcting the transmittance image generated by the transmittance image generating section, and a fog removal image generating section for removing fog in the input image based on the transmittance image corrected by the transmittance correcting section, the pixel value of atmospheric light, and the input image.

Furthermore, the transmittance correcting section of the present invention divides the transmittance image into predetermined regions, then performs binarization according to an average value of transmittances of each pixel in each divided predetermined region, and then selects transmittances of each pixel in each predetermined region based on a number of each value binarized in each predetermined region and an average value of transmittances of each value in each predetermined region. According to such a configuration, transmittances can be uniformized without imposing a large processing load comparing to soft matting.

Moreover, the transmittance correcting section of the present invention performs morphology processing on a transmittance image. Such a configuration can also uniformize transmittances without imposing a large processing load.

The present invention further includes a transmittance shaping section for shaping a transmittance image by multiplying a transmittance of each pixel of a transmittance image corrected in the transmittance correcting section and a transmittance of each pixel of a transmittance image generated in the transmittance image generating section, and then conducting a square root calculation of the multiplied value, and the fog removal image generating section removes fog in the input image based on the transmittance image shaped in the transmittance shaping section, the pixel value of atmospheric light, and the input image. According to such a configuration, generation of halos can be suppressed when a transmittance image was corrected in the transmittance correcting section.

The present invention further includes a range correcting section for expanding a range of the input image, and the dark channel image generating section generates a dark channel image based on the image whose range is expanded in the range correcting section. The fog removal image generating section removes fog in the image based on the transmittance image corrected in the transmittance correcting section, the pixel value of atmospheric light, and the image whose range is expanded in the range correcting section. According to such a configuration, fog in an image can be reduced by expanding a dynamic range of an input image.

Furthermore, the range correcting section of the present invention includes a first range correcting section for expanding a range of an area of an input image, a second range correcting section for dividing the input image into a plurality of areas and expanding a range of a plurality of the divided areas, and a compositing section for compositing the image whose range is expanded in the first range correcting section and the image whose range is expanded in the second range correcting section. According to such a configuration, fog can be more reliably reduced by compositing the images whose ranges are expanded at a plurality of hierarchical layers.

Moreover, the compositing section of the present invention multiplies the image whose range is expanded in the first range correcting section by a first coefficient, multiplies the image whose range is expanded in the second range correcting section by a second coefficient, and then adds these images. According to such a configuration, images can be composited after performing weighting in each image.

Furthermore, the second range correcting section of the present invention performs an interpolation processing on the range expanded images. Accordingly, continuity of pixel values is achieved in between the divided areas.

The present invention provides an image processing method for removing fog in an image, the method including a step for generating a dark channel image based on an input image, a step for generating a transmittance image based on the dark channel image generated in the step for generating the dark channel image and a pixel value of atmospheric light, a step for correcting the transmittance for correcting the transmittance image generated in the step for generating the transmittance image, and a step for generating a fog removal image for removing fog in the input image based on the transmittance image corrected in the step for correcting the transmittance, the pixel value of atmospheric light, and the input image.

The present invention provides a control program for making an arithmetic unit of an image processing device perform a dark channel image generating processing for generating a dark channel image based on an input image, a transmittance image generating processing for generating a transmittance image based on the dark channel image generated in the dark channel image generating processing and a pixel value of atmospheric light, a transmittance correcting processing for correcting the transmittance image generated in the transmittance image generating processing, and a fog removal image generating processing for removing fog in the input image based on the transmittance image corrected in the transmittance correcting processing, the pixel value of atmospheric light, and the input image.

According to the present invention, fog in an image can be quickly removed with a small processing load.

DETAILED DESCRIPTION OF THE EXEMPLARY EMBODIMENTS OF THE INVENTION

Figure 1:
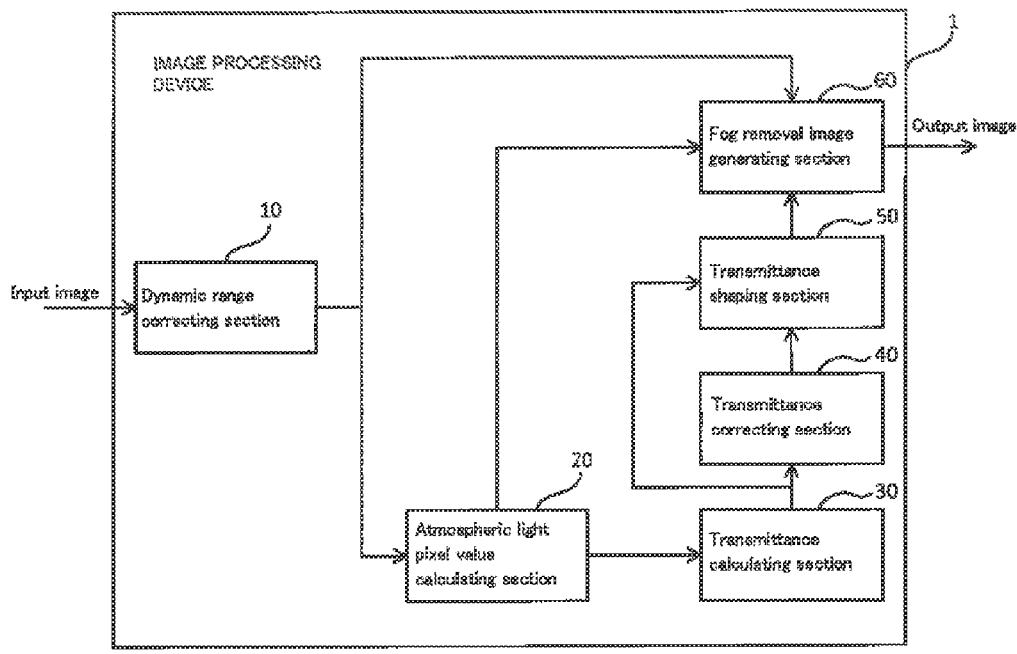
FIG. 1 is a block diagram illustrating a configuration of an image processing device according to a first embodiment.

Embodiments of the present invention are described herein with reference to the attached drawings. However, the present invention is not limited to these embodiments. Moreover, the scales in the drawings may be modified accordingly, for example by enlarging or emphasizing a part to describe the embodiments.

A First Embodiment

FIG. 1 is a block diagram illustrating a configuration of an image processing device 1 according to a first embodiment. The image processing device 1 illustrated in FIG. 1 is an device for performing a fog removal processing of an image as an image processing. The term "fog" indicates a phenomenon causing the low visibility due to small water particles floating in the air. "Fog" is also called as "mist" and "haze". Not limited to fog, phenomena that make an object in an image hard to be seen due to particulates in the air are also included. Furthermore, the term "image" includes a still image and a moving image. As illustrated in FIG. 1, the image processing device 1 includes a dynamic range correcting section (a range correcting section) 10, an atmospheric light pixel value calculating section (a dark channel image generating section) 20, a transmittance calculating section (a transmittance image generating section) 30, a transmittance correcting section 40, a transmittance shaping section 50, and a fog removal image generating section 60. The dynamic range correcting section 10 performs a processing (preprocessing) for expanding a dynamic range of an image. According to such a processing, fog in an image is reduced.

Figure 2:
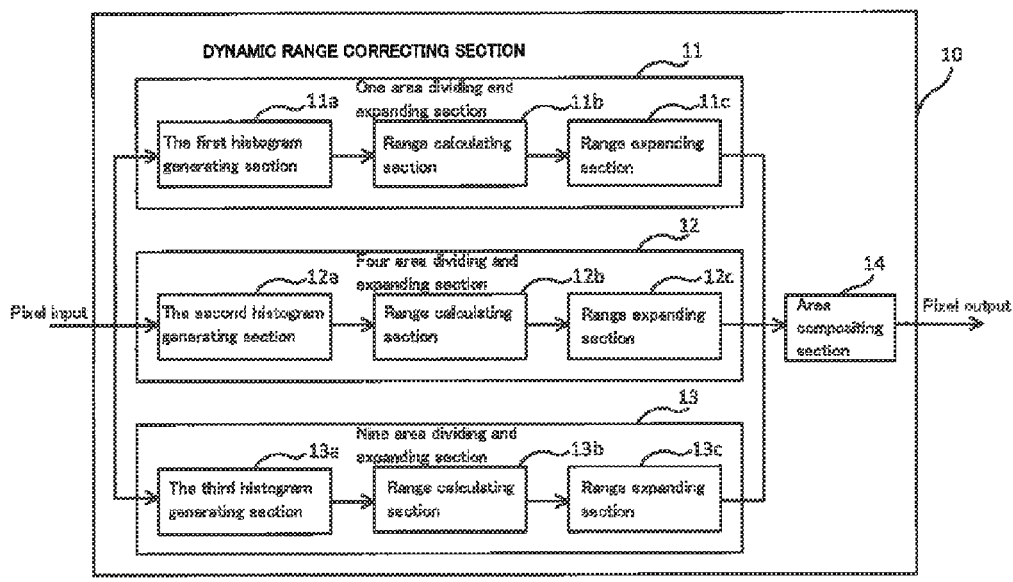
FIG. 2 is a block diagram illustrating a configuration of a dynamic range correcting section illustrated in FIG. 1.

FIG. 2 is a block diagram illustrating a configuration of the dynamic range correcting section 10 illustrated in FIG. 1. As illustrated in FIG. 2, the dynamic range correcting section 10 includes a one area dividing and expanding section (a first range correcting section) 11, a four area dividing and expanding section (a second range correcting section) 12, a nine area dividing and expanding section (a second range correcting section) 13, and an area compositing section (a compositing section) 14. The pixel value of each pixel of an input image is branched in the middle and each outputted to the one area dividing and expanding section 11, the four area dividing and expanding section 12, and the nine area dividing and expanding section 13.

The one area dividing and expanding section 11 expands a dynamic range of a whole area of an input image. As illustrated in FIG. 2, the one area dividing and expanding section 11 includes a first histogram generating section 11a, a range calculating section 11b, and a range expanding section 11c. The first histogram generating section 11a generates a histogram of a whole area of an input image. A histogram is a graphical representation for illustrating how many pixels exist in each luminous intensity (see FIG. 5). The range calculating section 11b removes (deletes) noise components in an input image using the histogram of the whole area of the input image generated in the first histogram generating section 11a. The range expanding section 11c performs a range expanding processing for expanding the range wherefrom the noise components in the input image have been removed in the range calculating section 11b into a predetermined range. Then, the range expanding section 11c outputs pixel values of each pixel to the area compositing section 14 after range expansion.

The four area dividing and expanding section 12 divides the area of the input image into four areas, and expands each dynamic range of the four divided areas. As illustrated in FIG. 2, the four area dividing and expanding section 12 includes a second histogram generating section 12a, a range calculating section 12b, and a range expanding section 12c. The second histogram generating section 12a divides the area of the input image into four areas, and generates each histogram of the four divided areas. The range calculating section 12b removes (deletes) noise components in each of four areas using the histogram of the four areas generated in the second histogram generating section 12a. The range expanding section 12c performs a range expanding processing for expanding the range of the four areas wherefrom the noise components have been removed in the range calculating section 12b into each predetermined range. Furthermore, the range expanding section 11c can achieve continuity of pixel values after range expansion by performing a bilinear interpolation processing in between the areas in the range expanding processing. Then, the range expanding section 12c outputs the pixel value of each pixel after range expansion into the area compositing section 14.

The nine area dividing and expanding section 13 divides the area of the input image into nine areas, and expands each dynamic range of the nine divided areas. As illustrated in FIG. 2, the nine area dividing and expanding section 13 includes a third histogram generating section 13a, a range calculating section 13b, and a range expanding section 13c. The third histogram generating section 13a divides the area of the input image into nine areas, and generates each histogram of the nine divided areas. The range calculating section 13b removes (deletes) noise components in each of nine areas using the histogram of the nine areas generated in the third histogram generating section 13a. The range expanding section 13c performs a range expanding processing for expanding the range of the nine areas wherefrom the noise components have been removed in the range calculating section 13b into each predetermined range. Furthermore, the range expanding section 13c can achieve continuity of pixel values after range expansion by performing a bilinear interpolation processing in between the areas in the range expanding processing. Then, the range expanding section 13c outputs the pixel value of each pixel after range expansion into the area compositing section 14.

The area compositing section 14 composites pixel values after expansion of dynamic range by the one area dividing and expanding section 11, the four area dividing and expanding section 12, and the nine area dividing and expanding section 13. Specifically, the area compositing section 14 inputs pixel values of each pixel after range expansion from each of the area dividing and expanding sections 11, 12, and 13. Then, the area compositing section 14 multiplies the inputted pixel value by a predetermined coefficient and adds up the multiplied values. The pixel value of each pixel composited by the area compositing section 14 are outputted to the atmospheric light pixel value calculating section 20 and the fog removal image generating section 60.

To get back to the description of FIG. 1, the atmospheric light pixel value calculating section 20 generates a dark channel image based on the pixel values of each pixel of a fog image (an image containing fog) outputted from the dynamic range correcting section 10. Furthermore, the atmospheric light pixel value calculating section 20 calculates a pixel value of atmospheric light of a fog image. Atmospheric light is light scattered by the particulates in the air. Of the pixel values of an image, the component of light scattered by the particulates in the air is the pixel value of atmospheric light.

Specifically, the atmospheric light pixel value calculating section 20 generates a dark channel image by setting the minimum value of R, G, and B in each pixel (the minimum value of each channel of R, G, and B) as a representative value (a dark channel value) of each pixel. In the method based on Dark Channel Prior described in the aforementioned non-patent document 1, the minimum value of all of the channel values in all of the pixels within a local area (a 15×15 pixel area) is used as the dark channel value, however, the present embodiment uses a dark channel value of each pixel ($minJ^c(y)$) as it is. In this way, the processing can be simplified by using a dark channel value of each pixel, not by using the minimum value of all of the channel values in all of the pixels within a local area (a 15×15 pixel area).

Moreover, the atmospheric light pixel value calculating section 20 sets the minimum pixel value of the representative values (the dark channel values) in a whole area of an input image as a pixel value of atmospheric light. In this way, the atmospheric light pixel value calculating section 20 of the present embodiment calculates one pixel value of atmospheric light for the whole area of an input image. The atmospheric light pixel value calculating section 20 outputs the pixel values of each pixel of a dark channel image and a pixel value of atmospheric light into the transmittance calculating section 30 and the fog removal image generating section 60.

The transmittance calculating section 30 calculates the transmittance of each pixel using pixel values of each pixel of a dark channel image and a pixel value of atmospheric light from the atmospheric light pixel value calculating section 20. In other words, the transmittance calculating section 30 calculates transmittances (dtrans) for every pixel by substituting dark channel values (Dark) for every pixel and a pixel value of atmospheric light (A) in the following equation (1).

$$D\text{trans} = 1 - \omega \times \text{Dark}/A \qquad (1)$$

Herein, $\omega$ is a parameter for controlling strength of fog removal. The transmittance calculating section 30 generates a transmittance image from the transmittances of each pixel. Then, the transmittance calculating section 30 outputs the transmittance image (the transmittances of each pixel) into the transmittance correcting section 40 and the transmittance shaping section 50.

The transmittance correcting section 40 corrects the transmittance image (the initial transmittance image) outputted from the transmittance calculating section 30. Specifically, the transmittance correcting section 40 performs uniformization of transmittance by expansion processing (dilation) of the initial transmittance image and generates a transmittance uniformized image. Furthermore, the transmittance correcting section 40 generates a transmittance corrected image using the transmittance uniformized image and the initial transmittance image. The transmittance correcting section 40 outputs the generated transmittance corrected image into the transmittance shaping section 50. The details of the processing performed by the transmittance correcting section 40 will be described later (see FIG. 7).

The transmittance shaping section 50 performs a shaping processing of a transmittance image based on the transmittance image outputted from the transmittance calculating section 30 and the transmittance corrected image outputted from the transmittance correcting section 40. In other words, the transmittance shaping section 50 shapes a transmittance image by multiplying the transmittance image (the transmittance of each pixel) before the correction is made by the transmittance correcting section 40 and the transmittance image (the transmittance of each pixel) after the correction is made by the transmittance correcting section 40, and then obtaining a square root of the value. The transmittance shaping section 50 outputs the shaped transmittance image into the fog removal image generating section 60.

The fog removal image generating section 60 performs a fog removal processing for removing fog in an image based on a pixel value of atmospheric light outputted from the atmospheric light pixel value calculating section 20, transmittances of each pixel after shaping (a transmittance image after shaping) outputted from the transmittance shaping section 50, and pixel values of each pixel in a fog image outputted from the dynamic range correcting section 10.

The dynamic range correcting section 10, the atmospheric light pixel value calculating section 20, the transmittance calculating section 30, the transmittance correcting section 40, the transmittance shaping section 50, and the fog removal image generating section 60, of the image processing device 1 are realized by an arithmetic unit such as a CPU (Central Processing Unit) performing a processing based on a control program.

Figure 3:
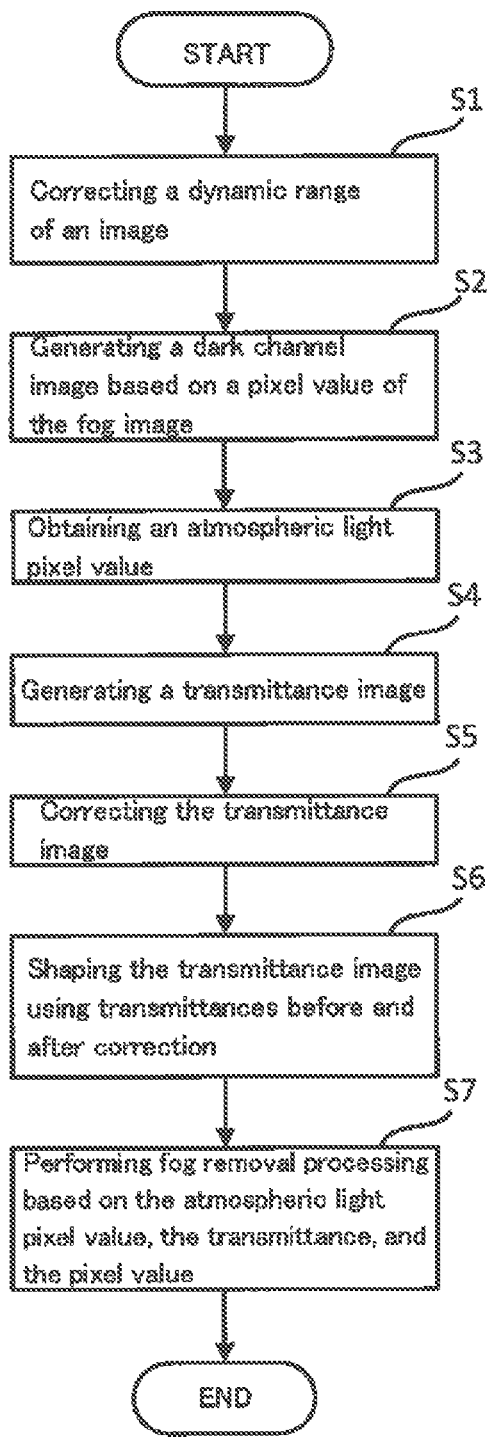
FIG. 3 is a flowchart for describing an image processing method according to the first embodiment.

An image processing method performed by the image processing device 1 is described herein. FIG. 3 is a flowchart for describing an image processing method according to the first embodiment. In the following description, the case wherein the image processing device 1 removes fog in a moving image (an image) is described.

Figure 4:
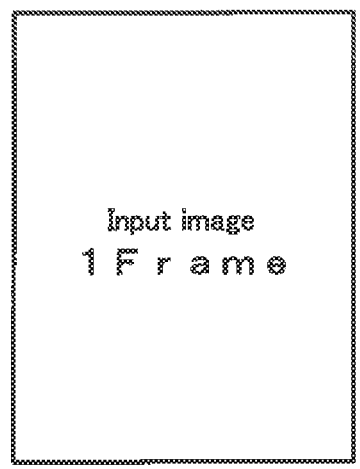
FIG. 4 illustrates areas for generating a histogram according to a one area dividing and expanding section, a four area dividing and expanding section, and a nine area dividing and expanding section.
Figure 4:
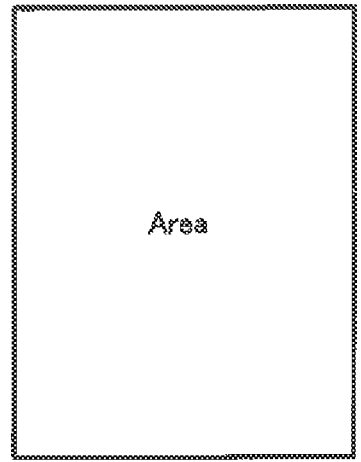
Figure 4:
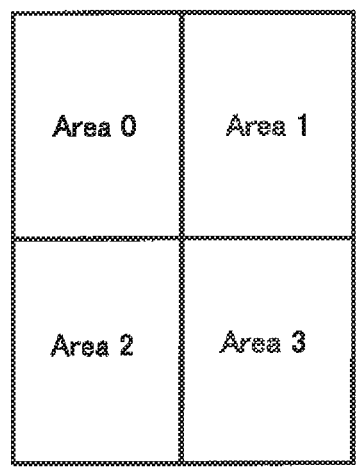
Figure 4:
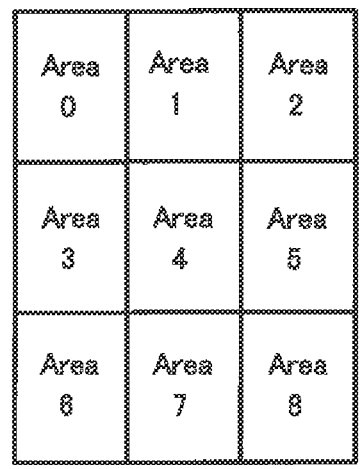

In the processing illustrated in FIG. 3, the dynamic range correcting section 10 corrects the dynamic range of an input image (Step S1). FIG. 4 illustrates areas for generating a histogram according to a one area dividing and expanding section 11, a four area dividing and expanding section 12, and a nine area dividing and expanding section 13. FIG. 4(A) illustrates one frame area of a moving image which is an input image. FIG. 4(B) illustrates an area for generating a histogram according to a one area dividing and expanding section 11 (a first histogram generating section 11a). FIG. 4(C) illustrates four areas for generating a histogram (Area 0, Area 1, Area 2, and Area 3) according to a four area dividing and expanding section 12 (a second histogram generating section 12a). FIG. 4(D) illustrates nine areas for generating a histogram (Area 0, Area 1, Area 2, Area 3, Area 4, Area 5, Area 6, Area 7, and Area 8) according to a nine area dividing and expanding section 13 (a third histogram generating section 13a).

The first histogram generating section 11a generates a histogram of an area of an input image without dividing the area of the input image as illustrated in FIG. 4(B). The second histogram generating section 12a generates a histogram of each area of the input image by dividing the area of the input image into four areas as illustrated in FIG. 4(C). The third histogram generating section 13a generates a histogram of each area of the input image by dividing the area of the input image into nine areas. The area illustrated in FIG. 4(B) is called a zero hierarchical layer area, each area illustrated in FIG. 4(C) is called a first hierarchical layer area, and an area illustrated in FIG. 4(D) is called a second hierarchical layer area.

Figure 5:
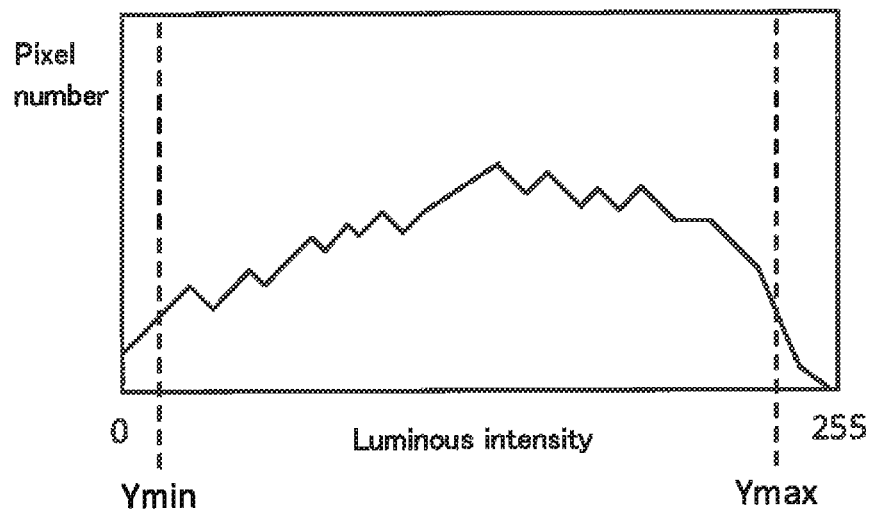
FIG. 5 illustrates an example of a histogram generated by an area dividing and expanding section.

FIG. 5 illustrates an example of a histogram generated by the area dividing and expanding sections 11, 12, and 13. For example, the histogram illustrated in FIG. 5 is generated by the first histogram generating section 11a for the area of the input image (FIG. 4(B)). The horizontal axis of the histogram in FIG. 5 represents the luminous intensity of pixels (luminance level, illuminance, and gradation). In the horizontal axis, "0" is the darkest (black), and it gets brighter as moving towards the right side. In the horizontal axis, "255" is the brightest (white). The vertical axis represents a number of pixels relative to the luminous intensity (in other words, the vertical axis represents a number of pixels at the same luminous intensity).

The range calculating section 11b sequentially adds a number of pixels (a pixel number) from the luminous intensity of "0" towards the right direction of the horizontal axis. The range calculating section 11b determines whether the added pixel number exceeds a predetermined setting value of a pixel number or not. Then, the range calculating section 11b sets the value just before the value of the luminous intensity wherein the added pixel number exceeds the setting value of a pixel number as the minimum value Ymin. Y represents a pixel value (luminance) of an image with no color (an image of one channel of luminance). In other words, Y corresponds to any one of R, G, or B. Furthermore, the range calculating section 11b sequentially adds a number of pixels from the luminous intensity of "255" towards the left direction of the horizontal axis. The range calculating section 11b determines whether the added pixel number exceeds a setting value of a pixel number or not. Then, the range calculating section 11b sets the value just before the value of the luminous intensity wherein the added pixel number exceeds the setting value of a pixel number as the maximum value Ymax.

A setting value of a pixel number is a value for determining noise portions of the max side (the side of 255) and the min side (the side of 0). A setting value of a pixel number is for example, 1-3% of all the pixel numbers in the area. In the present embodiment, the setting value of a pixel number is 1% of all the pixel numbers in the area.

In the same way as in the range calculating section 11b, the range calculating section 12b also calculates the minimum value Ymin and the maximum value Ymax by determining whether the added pixel number exceeds a setting value of a pixel number or not for each of the four areas (Area 0, Area 1, Area 2, and Area 3). In the same way as in the range calculating section 11b, the range calculating section 12b also calculates the minimum value Ymin and the maximum value Ymax by determining whether the added pixel number exceeds a setting value of a pixel number or not for each of the nine areas (Area 0, Area 1, Area 2, Area 3, Area 4, Area 5, Area 6, Area 7, and Area 8).

The range calculating sections 11b-13a set the minimum value Ymin as 0 (Ymin=0) and the maximum value Ymax as 255 (Ymax=255) when (Ymax−Ymin)<minval (minval is within the range of 5-15) for each of R, G, and B. In the present embodiment, minval is 10. In this way, the dynamic range is not expanded for the area with no substantial change in pixel values (luminance) (the area with almost uniform colors) Accordingly, an incorrect expansion (a malfunction) in dynamic range can be prevented.

The range expanding section 11c calculates a target value (TargetValue) of each pixel in the area of an input image based on the pixel value PixVal of each pixel in the area of an input image, the minimum value Ymin in the area of an input image, and the maximum value Ymax in the area of an input image. Specifically, the range expanding section 11c calculates a target value (TargetValue) by substituting a pixel value PixVal, the minimum value Ymin, and the maximum value Ymax in the following equation (2).

$$\text{TargetValue} = (\text{PixVal} - Y\text{min}) * 255 / (Y\text{max} - Y\text{min}) \qquad (2)$$

The range expanding section 11c generates a table (R, G, and B) of the area of an input image for the pixel value PixVal of 0-255 in the blank (the period in between the present frame and the next frame). In the table (R, G, and B), the range expanding section 11c sets the pixel value as 0 for the value equal to or below the minimum value Ymin, and sets the pixel value as 255 for the value equal to or exceeding the maximum value Ymax.

The range expanding section 11c uses each of the values R, G, and B as the minimum value Ymin and the maximum value Ymax in case of adjusting the white balance of an image. On the other hand, the range expanding section 11c uses the largest value of the maximum values Ymax of each of R, G, and B as the maximum value Ymax in common for R, G, and B in case that the white balance of an image is not adjusted. In other words, Ymax=max(Rmax, Gmax, Bmax) (the range expanding section 11c selects the maximum value of Rmax, Gmax, and Bmax). Furthermore, the range expanding section 11c uses the smallest value of the minimum values Ymin of each of R, G, and B as the minimum value Ymin in common for R, G, and B in case that the white balance of an image is not adjusted. In other words, Ymin=min(Rmin, Gmin, Bmin) (the range expanding section 11c selects the minimum value of Rmin, Gmin, and Bmin).

Then, the range expanding section 11c outputs the pixel value of each pixel calculated in the above equation (2) (namely, a target value (TargetValue)) into the area compositing section 14.

In the same way as in the range expanding section 11c, the range expanding section 12c also calculates a pixel value of each pixel (namely, a target value (TargetValue)) corresponding to each of the four areas (Area 0, Area 1, Area 2, and Area 3). Also in this case, the range expanding section 12c calculates a target value using the minimum value Ymin and the maximum value Ymax corresponding to whether the white balance of an image is adjusted or not. Furthermore, the range expanding section 13c also calculates a pixel value of each pixel (namely, a target value (TargetValue)) corresponding to each of the nine areas (Area 0, Area 1, Area 2, Area 3, Area 4, Area 5, Area 6, Area 7, and Area 8) in the same way as in the range expanding section 11c. Also in this case, the range expanding section 13c calculates a target value using the minimum value Ymin and the maximum value Ymax corresponding to whether the white balance of an image is adjustment or not.

The range expanding section 12c and the range expanding section 13c perform a bilinear interpolation processing in between the areas so that the pixel values between the divided areas have a continuity. In bilinear interpolation, a pixel value is found by using a 2×2 pixel (4 pixels) around the position of interest and linearly interpolating a pixel value (a luminance value). Each of the range expanding section 12c and the range expanding section 13c calculates range expansion values of each pixel (TexpValue; the pixel value after range expansion) by bilinear interpolation based on the pixel values in the central positions of each area divided by the second histogram generating section 12a and the third histogram generating section 13a.

Figure 6:
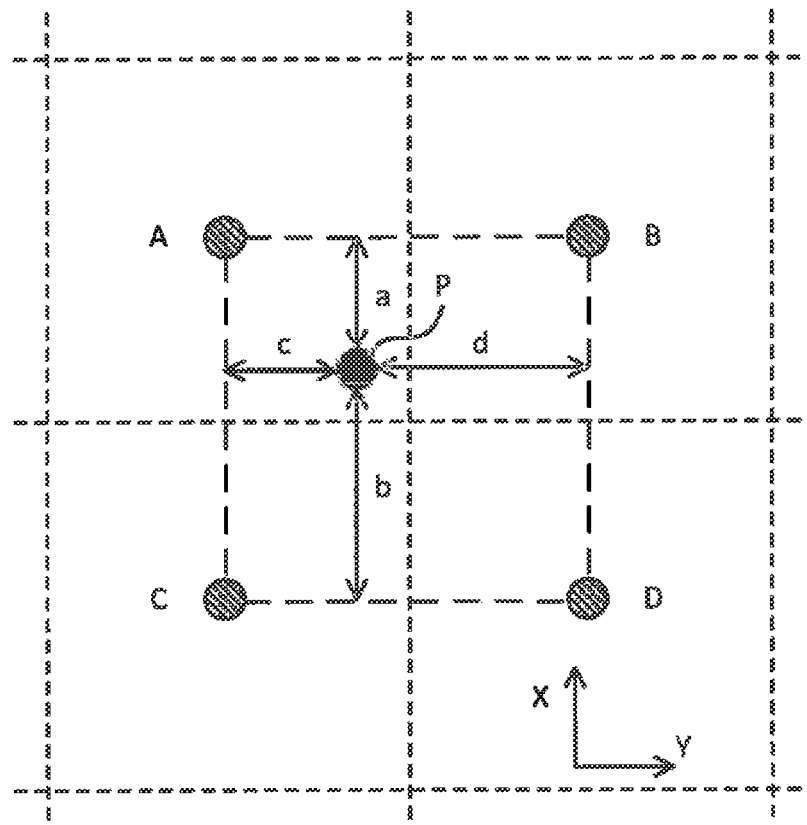
FIG. 6 illustrates a bilinear interpolation processing.

FIG. 6 illustrates a bilinear interpolation processing. In FIG. 6, the letter P indicates a pixel for performing a bilinear interpolation processing. The letters A, B, C, and D indicate the central positions of the four areas. In the areas illustrated in FIG. 4(C), A is the pixel of the central position in Area 0, B is the pixel of the central position in Area 1, C is the pixel of the central position in Area 2, and D is the pixel of the central position in Area 3. Furthermore, in FIG. 4(D), A is the pixel of the central position in Area 3, B is the pixel of the central position in Area 4, C is the pixel of the central position in Area 6, and D is the pixel of the central position in Area 7, for example. The letter a indicates a distance in a y direction from the pixel P to the pixel A or B, the letter b indicates a distance in a y direction from the pixel P to the pixel C or D, the letter c indicates a distance in an x direction from the pixel P to the pixel A or C, and the letter d indicates a distance in an x direction from the pixel P to the pixel B or D.

The range expanding section 12c and the range expanding section 13c calculate range expansion values (TexpValue; the pixel value after range expansion) by substituting the pixel values of the pixel A, B, C, and D, and the distances a, b, c, and d in the following equation (3).

$$TexpValue=((A*d+B*c)*b+(C*d+D*c)*a)/((c+d)*(a+b)) \quad (3)$$

A, B, C, and D in the equation (3) above are the table index values of the expanded values of the pixel values (Pixelvalue) in each area.

In particular, for the x direction, a counter for counting 0 until A(x) is reached, and then counting up +1 each time until B(x) is reached (an up counter (c)), and a counter for counting (c+d) until A(x) is reached, and then counting down −1 each time until B(x) is reached (a down counter (d)) are prepared. For the y direction, a counter for counting 0 until A(y) is reached, and then counting up +1 each time until C(y) is reached (an up counter (a)), and a counter for counting (a+b) until A(y) is reached, and then counting down −1 each time until C(y) is reached (a down counter (b)) are prepared. Then, the range expanding section 12c and the range expanding section 13c perform an operation of a bilinear interpolation processing using these counters.

In this way, a pixel value in the intermediate position can be found from the ratio of the pixel values in the central positions of each area by a bilinear interpolation processing. Then, the range expanding section 12c outputs the pixel values of each pixel calculated in the equation (3) above (namely, the range expansion value (TexpValue)) to the area compositing section 14. Also, the range expanding section 13c outputs the pixel values of each pixel calculated in the equation (3) above (namely, the range expansion value (TexpValue)) to the area compositing section 14.

The area compositing section 14 inputs the pixel value A1 outputted from the one area dividing and expanding section 11, the pixel value A4 outputted from the four area dividing and expanding section 12, and the pixel value A9 outputted from the nine area dividing and expanding section 13. The area compositing section 14 multiplies the pixel value A1 by the coefficient $\alpha 1$, multiplies the pixel value A4 by the coefficient $\alpha 4$, and multiplies the pixel value A9 by the coefficient $\alpha 9$. Then, the area compositing section 14 adds up the values of the pixel values A1, A4, and A9 multiplied by the coefficients $\alpha 1$, $\alpha 4$, and $\alpha 9$ respectively to calculate a composite pixel value. In other words, the area compositing section 14 calculates a composite pixel value by substituting the pixel values A1, A4, and A9, and the coefficients $\alpha 1$, $\alpha 4$, and $\alpha 9$ in the following equation (4).

$$\text{Composite pixel value}=A1*\alpha 1+A4*\alpha 4+A9*\alpha 9 \quad (4)$$

Herein, $\alpha 1+\alpha 4+\alpha 9=1.0$. In the present embodiment, the coefficient $\alpha 1$ is 0.5, the coefficient $\alpha 4$ is 0.3, and the coefficient $\alpha 9$ is 0.2. The area compositing section 14 can composite (integrate) weighted pixel values in each hierarchical layer by setting such coefficient values.

To get back to the description of FIG. 3, the atmospheric light pixel value calculating section 20 generates a dark channel image based on the pixel values of each pixel of the fog image outputted from the dynamic range correcting section 10 (STEP S2). Specifically, the atmospheric light pixel value calculating section 20 generates a dark channel image by setting the minimum value of R, G, and B in each pixel (the minimum value of each channel of R, G, and B) as the dark channel value of each pixel (r, g, and b). Furthermore, the atmospheric light pixel value calculating section 20 obtains the minimum value of the dark channel value as the atmospheric light pixel values (atmosr, atmosg, and atmosb) for the whole area of an input image (STEP S3).

The transmittance calculating section 30 calculates the transmittance of each pixel (dtrans) using the pixel values (r, g, and b) of each pixel of the dark channel image and the pixel values of atmospheric light (atmosr, atmosg, and atmosb) from the atmospheric light pixel value calculating section 20. Specifically, the transmittance calculating section 30 calculates the transmittance of each pixel (dtrans) by substituting the pixel values (r, g, and b) of each pixel of the dark channel image and the pixel values of atmospheric light (atmosr, atmosg, and atmosb) in the following equation (5).

$$d\text{trans}=1-l\text{omega}*dtmplA/100.0 \qquad (5)$$

Here, the equation (5) corresponds to the equation (1) described above. The term lomega corresponds to ω in the equation (1) described above. The term dtmplA is r/atmosr (dtmplA=r/atmosr) when dtmplA>(r/atmosr). The term dtmplA is g/atmosg (dtmplA=g/atmosg) when dtmplA>(g/atmosg). The term dtmplA is b/atmosb (dtmplA=b/atmosb) when dtmplA>(b/atmosb). The term dtmplA is 1.0 (dtmplA=1.0) when not dtmplA>(r/atmosr), dtmplA>(g/atmosg), or dtmplA>(b/atmosb).

The transmittance calculating section 30 outputs the transmittance image composed of the transmittances of each pixel calculated as described above to the transmittance correcting section 40 and to the transmittance shaping section 50.

Figure 7:
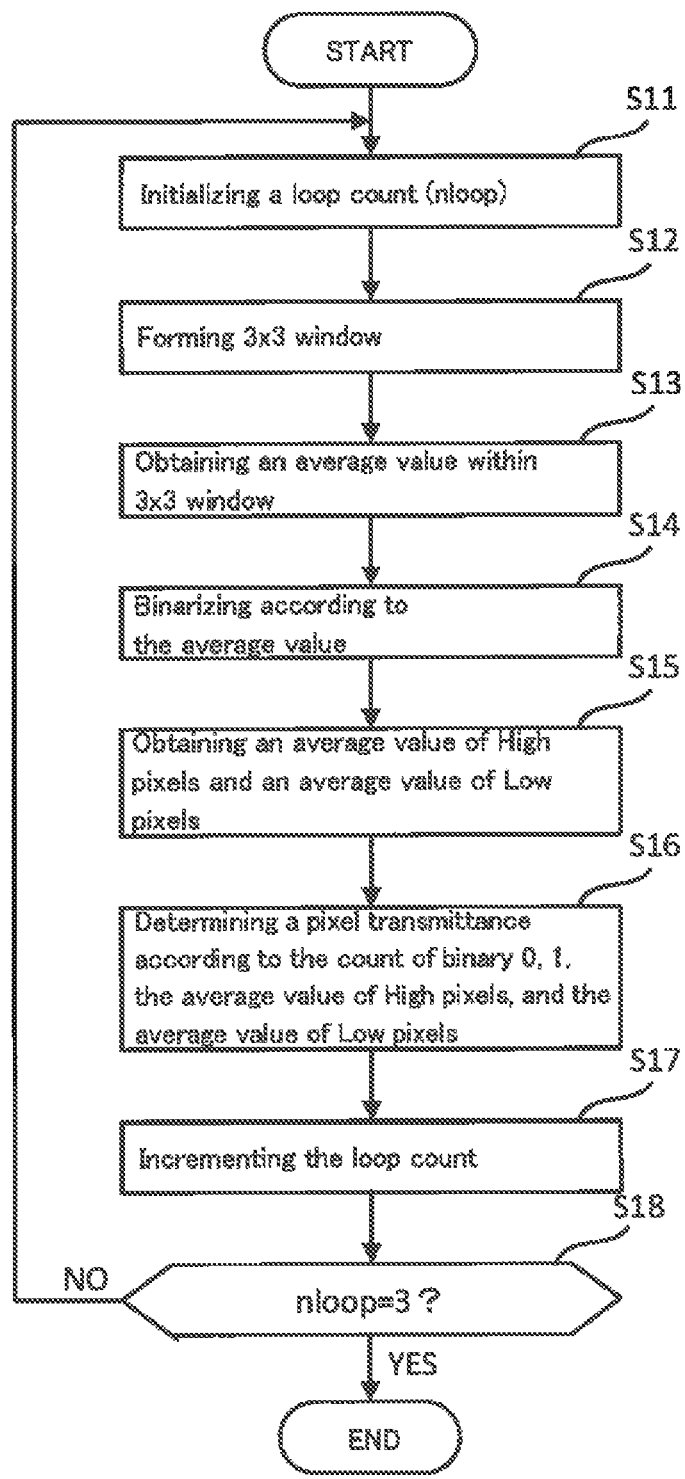
FIG. 7 is a flowchart illustrating a transmittance correcting processing by a transmittance correcting section.

The transmittance correcting section 40 corrects the transmittance image (the initial transmittance image) outputted from the transmittance calculating section 30 (STEP S5). The transmittance correcting processing performed by the transmittance correcting section 40 is described referring to FIG. 7. FIG. 7 is a flowchart illustrating a transmittance correcting processing by a transmittance correcting section. In the processing illustrated in FIG. 7, the transmittance correcting section 40 initializes a loop count (nloop) (STEP S11). In other words, the initial value 0 is substituted for nloop in the transmittance correcting section 40. Then, a 3×3 pixel area (a 3×3 window) is formed in the area of the transmittance image in the transmittance correcting section 40 (STEP S12). Then, an average value of the transmittance within each 3×3 pixel area (a 3×3 window) is obtained in the transmittance correcting section 40 (STEP S13).

Then, binarization of each pixel is performed in the transmittance correcting section 40 according to the average value in each 3×3 pixel area (STEP S14). In other words, in the transmittance correcting section 40, pixels are divided into the pixels higher than the average value (High pixels) and the pixels lower than the average value (Low pixels) of the transmittance of each pixel in each 3×3 pixel area. The transmittance correcting section 40 defines High pixels as "1" and Low pixels as "0". Furthermore, the average value of the transmittances of High pixels (have) is obtained, and the average value of the transmittances of Low pixels (lave) is obtained in the transmittance correcting section 40 (STEP S15). In the transmittance correcting section 40, a count of High pixels (hcnt) and a count of Low pixels (lcnt) are counted in each 3×3 pixel area. The average value (aave) of the transmittances in the whole transmittance image is calculated in the transmittance correcting section 40. Then, the transmittance in the pixels of each 3×3 pixel area (Ttrans) is determined in the transmittance correcting section 40 according to the following requirements (STEP S16). Herein, abs( ) indicates an absolute value within ( ). Moreover, Ctrans indicates the transmittance of the central pixel of a 3×3 pixel area.

The transmittance correcting section 40 defines the transmittance (Ttrans) as the average value of the Low pixels (lave) when the count of the Low pixels (lcnt) is equal to or more than 7 (lcnt≥7). Also, the transmittance correcting section 40 defines the transmittance (Ttrans) as the average value of the High pixels (have) when the count of the High pixels (hcnt) is equal to or more than 7 (hcnt≥7). The transmittance correcting section 40 defines the transmittance (Ttrans) as the transmittance Ctrans of the central pixel of a 3×3 pixel area when (have−lave)*255>20 and abs(aave−Ctrans)<5. Furthermore, the transmittance correcting section 40 defines the transmittance (Ttrans) as the average value of the High pixels (have) when Ctrans>(lave+have)/2.0. The transmittance correcting section 40 defines the transmittance (Ttrans) as the average value of the Low pixels (lave) in other cases.

After that, a loop count is incremented (nloop=nloop+1) in the transmittance correcting section 40 (STEP S17). The transmittance correcting section 40 determines whether the loop count is 3 or not (nloop=3?) (STEP S18), and repeats the processings of STEP S11-STEP S17 until the loop count reaches 3. The transmittance correcting section 40 ends the transmittance correcting processing when the loop count is determined to be 3. The transmittance correcting section 40 outputs the transmittance (Ttrans) determined as illustrated in FIG. 7 to the transmittance shaping section 50.

To get back to the description of FIG. 3, the transmittance shaping section 50 inputs the transmittances of each pixel outputted from the transmittance calculating section 30 (dtrans) and the transmittances of each pixel outputted from the transmittance correcting section 40 (Ttrans). Then, the transmittance shaping section 50 calculates transmittances of each pixel after shaping (Mtrans) by substituting the transmittances (dtrans and Ttrans) in the following equation (6) (STEP S6). In other words, the transmittance shaping section 50 shapes a transmittance image using the transmittances before correction (dtrans) and the transmittances after correction (Ttrans) In the equation (6), sqrt( ) means to find the square root of ( ).

$$M\text{trans}=\text{sqrt}(d\text{trans}*T\text{trans}) \qquad (6)$$

After that, the transmittance shaping section 50 outputs the transmittances after shaping (Mtrans) to the fog removal image generating section 60. Then, the fog removal image generating section 60 performs a fog removal processing for removing fog in an image based on the pixel values of atmospheric light (atmosr, atmosg, and atmosb) outputted from the atmospheric light pixel value calculating section 20, the transmittances of each pixel after shaping (Mtrans) outputted from the transmittance shaping section 50, and the pixel values of each pixel of a fog image (r, g, and b) outputted from the dynamic range correcting section 10 (STEP S7). Specifically, the fog removal image generating section 60 calculates the pixel values of each pixel wherein fog in an image is removed (newR, newG, and newB) by substituting the pixel values of atmospheric light (atmosr, atmosg, and atmosb), the transmittances (Mtrans) and the pixel values (r, g, and b) in the following equations (7-1)-(7-3).

$$\text{new}R=(r-atmosr)/M\text{trans}+atmosr \qquad (7\text{-}1);$$

$$\text{new}G=(g-atmosg)/M\text{trans}+atmosg \qquad (7\text{-}2);$$

$$\text{new}B=(b-atmosb)/M\text{trans}+atmosb \qquad (7\text{-}3);$$

The processing by the transmittance shaping section 50 may be omitted if the transmittance correcting section 40 performed the processing as illustrated in FIG. 7. In this case, the transmittance correcting section 40 outputs the transmittance (Ttrans) to the fog removal image generating section 60, and the fog removal image generating section 60 performs the fog removal processing for removing fog in an image based on the pixel values of atmospheric light (atmosr, atmosg, and atmosb) outputted from the atmospheric light pixel value calculating section 20, the transmittances of each pixel (Ttrans) outputted from the transmittance correcting section 40, and the pixel values of each pixel of a fog image (r, g, and b) outputted from the dynamic range correcting section 10.

As described above, the first embodiment includes a dark channel image generating section 20 for generating a dark channel image based on an input image, a transmittance image generating section 30 for generating a transmittance image based on the dark channel image generated in the dark channel image generating section 20 and a pixel value of atmospheric light, a transmittance correcting section 40 for correcting the transmittance image generated in the transmittance image generating section 30, and a fog removal image generating section 60 for removing fog in the input image based on the transmittance image corrected in the transmittance correcting section 40, the pixel value of atmospheric light, and the input image. According to such a configuration, fog in an image can be quickly removed with a small processing load.

Furthermore, the transmittance correcting section 40 of the first embodiment divides a transmittance image into predetermined areas (for example, 3×3 pixel areas), binarizes according to an average value of the transmittances of each pixel in each predetermined area divided, and selects transmittances of each pixel within each predetermined area based on a number of each value binarized in each predetermined area and an average value of the transmittances of each value within each predetermined area. According to such a configuration, transmittances can be uniformized without imposing a large processing load comparing to soft matting.

The first embodiment further includes a transmittance shaping section 50 for shaping a transmittance image by multiplying a transmittance of each pixel of the transmittance image corrected in the transmittance correcting section 40 and a transmittance of each pixel of the transmittance image generated in the transmittance image generating section 30, and then conducting a square root calculation of the multiplied value. The fog removal image generating section 60 removes fog in an input image based on the transmittance image shaped in the transmittance shaping section 50, the pixel value of atmospheric light, and the input image. According to such a configuration, generation of halos can be suppressed when a correction of a transmittance image was conducted in the transmittance correcting section 40.

The first embodiment further includes a range correcting section 10 for expanding a range of an input image, wherein the dark channel image generating section 20 generates a dark channel image based on the image whose range is expanded in the range correcting section 10, and the fog removal image generating section 60 removes fog in the image based on the transmittance image corrected in the transmittance correcting section 40, the pixel value of atmospheric light, and the image whose range is expanded in the range correcting section 10, According to such a configuration, fog in an image can be reduced by expanding a dynamic range of an input image.

In the first embodiment, the range correcting section 10 includes a first range correcting section 11 for expanding the range of the area of an input image, a second range correcting section 12 for dividing the input image into a plurality of areas and expanding the ranges of the plurality of divided areas, and a compositing section 14 for compositing the range expanded image from the first range correcting section 11 and the range expanded image from the second range correcting section 12. According to such a configuration, fog can be more reliably reduced by compositing the images whose ranges were expanded at a plurality of hierarchical layers.

In the first embodiment, the co positing section 14 multiplies the image whose range is expanded in the first range correcting section 11 by a first coefficient, multiplies the image whose range is expanded in the second range correcting section 12 by a second coefficient, and then adds these images. According to such a configuration, images can be composited after performing weighting on each image. In the first embodiment, the second range correcting section 12 performs an interpolation processing on range expanded images, therefore continuity of pixel values is achieved in between the divided areas.

A Second Embodiment

In the first embodiment described above, the transmittance correcting section 40 performs the transmittance correcting processing as illustrated in FIG. 7, meanwhile, a transmittance morphology processing section 40A performs a transmittance correcting processing (an expansion processing and a morphology processing) in the second embodiment.

Figure 8:
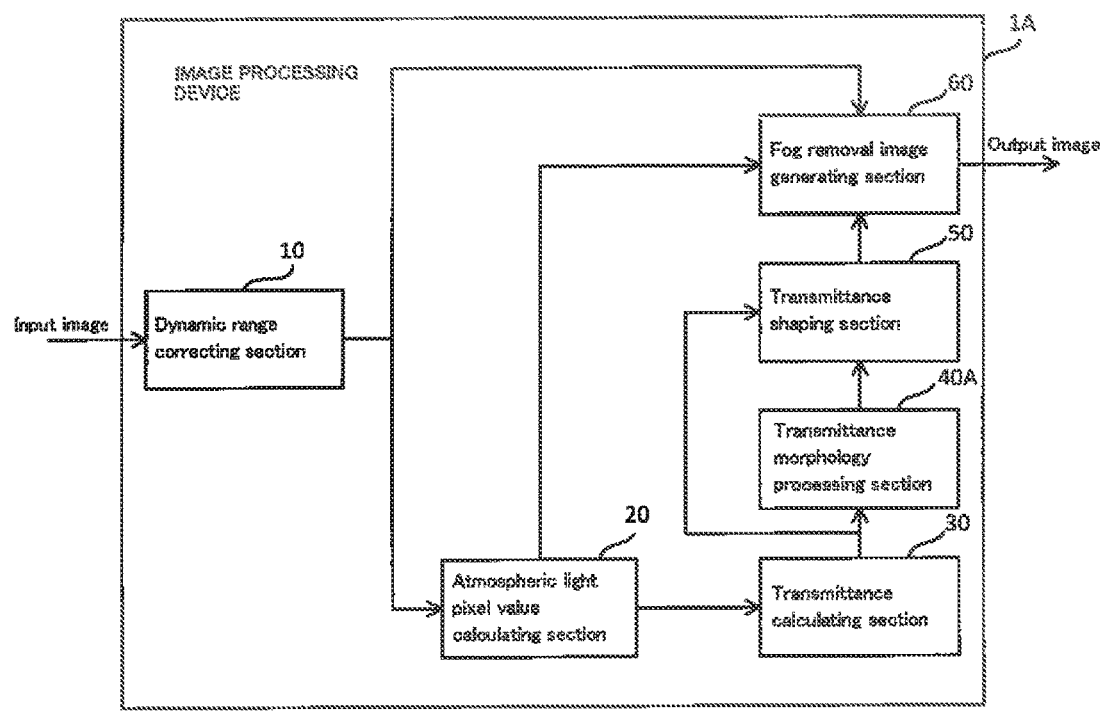
FIG. 8 is a block diagram illustrating a configuration of an image processing device according to a second embodiment.

FIG. 8 is a block diagram illustrating a configuration of an image processing device according to a second embodiment. An image processing device 1A illustrated in FIG. 8 includes a transmittance morphology processing section 40A instead of the transmittance correcting section 40 in the image processing device 1 illustrated in FIG. 1. The other configurations are similar to the configurations described for FIG. 1, therefore, repetitive descriptions are omitted.

The transmittance morphology processing section 40A performs a morphology processing on a transmittance image outputted from the transmittance calculating section 30. Specifically, the transmittance morphology processing section 40A forms a 3×3 pixel area (a 3×3 window) in the area of the transmittance image. Then, the transmittance morphology processing section 40A obtains an average value of the transmittances within each 3×3 pixel area (a 3×3 window). The transmittance morphology processing section 40A further performs binarization of each pixel according to the average value in each 3×3 pixel area. Then, the transmittance morphology processing section 40A defines the transmittance of the target pixel as the average value (have) of the transmittances of the High pixels within the 3×3 pixel area if at least one pixel out of eight pixels adjacent to the target pixel (the central pixel) within each 3×3 pixel area is a High pixel. Such processing is called a morphology processing.

Figure 9:
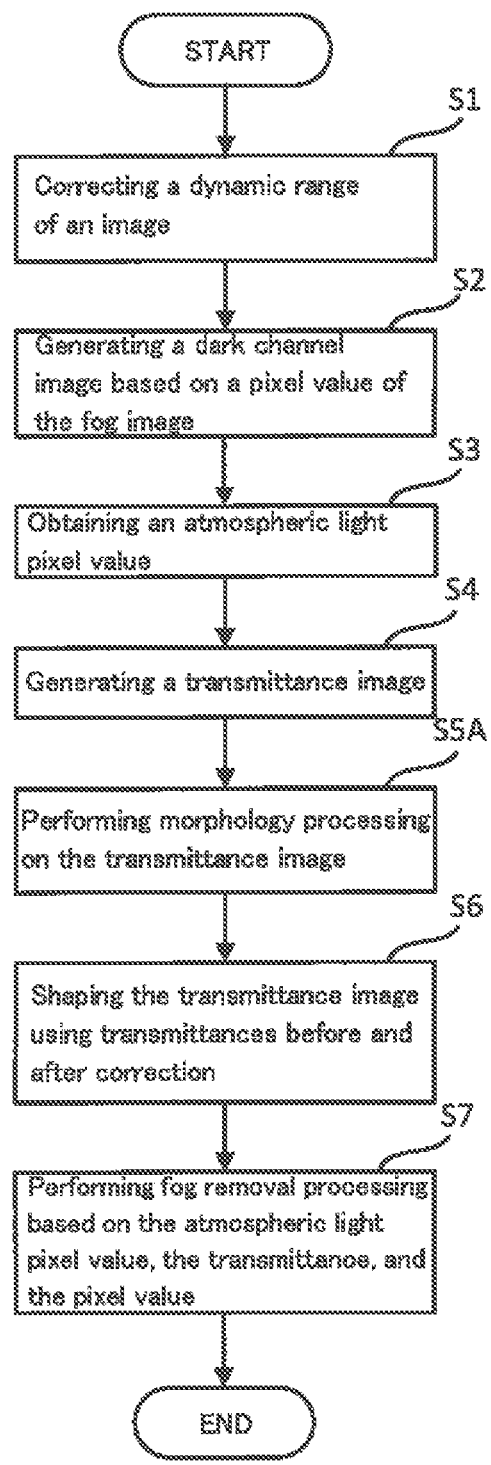
FIG. 9 is a flowchart for describing an image processing method according to the second embodiment.

FIG. 9 is a flowchart for describing an image processing method according to the second embodiment. The repetitive descriptions will be omitted since the processings other than of STEP S5A in FIG. 9 are similar to the processings described in FIG. 3.

In STEP S5A, the transmittance morphology processing section 40A performs a morphology processing on a transmittance image. As described above, the transmittance morphology processing section 40A defines the transmittance of the target pixel as the average value (have) of the transmittances of the High pixels within the 3×3 pixel area if at least one pixel out of eight pixels adjacent to the target pixel (the central pixel) within each 3×3 pixel area is a High pixel. In this way, when the transmittance morphology processing section 40A performs a morphology processing (a simple multi-value expansion processing), a processing by the transmittance shaping section 50 becomes necessary.

As described above, the transmittance correcting section 40 performs a morphology processing on a transmittance image in the second embodiment. Such a configuration can also uniformize the transmittances without imposing a large processing load.

The embodiments of the present invention are described above, however, the technical scope of the present invention is not limited to the scope described in the embodiments above. Various modifications and improvements can be applied to the above embodiments without departing from the spirit of the present invention. Moreover, one or more elements described in the above embodiments may be omitted. Such modifications, improvements, and omitted embodiments are also included in the technical scope of the present invention. Furthermore, the embodiments described above and the configurations of the variations can be properly combined and applied.

In the first and the second embodiments described above, a fluctuation absorbing device can also be the audio IP conversion device 1B and the audio IP conversion device 5B, not limiting to the audio IP conversion device 2A and the audio IP conversion device 6A. Accordingly, the audio IP conversion device 1B may have the same configuration as the audio IP conversion device 2A, and the audio IP conversion device 5B may have the same configuration as the audio IP conversion device 6A.

Although the dynamic range correcting section 10 performs range expansion of an image in three layers in the first embodiment described above, range expansion of an image can be performed in two or more layers.

Furthermore, the transmittance correcting section 40 divides a transmittance image into 3×3 pixel areas in the first embodiment described above (see STEP S12), however, the areas are not limited to 3×3 pixels but can be with different pixel numbers. The bilinear interpolation processing is used for the interpolation processing, however, other interpolation processings can also be used.

What is claimed is:

1. An image processing device, comprising:
   a dark channel image generating section for generating, by an arithmetic unit, a dark channel image based on an input image;
   a transmittance image generating section for generating, by the arithmetic unit, a transmittance image based on the dark channel image generated by the dark channel image generating section and a pixel value of atmospheric light;
   a transmittance correcting section for correcting, by the arithmetic unit, the transmittance image generated by the transmittance image generating section; and
   a fog removal image generating section for removing, by the arithmetic unit, fog in the input image based on the transmittance image corrected by the transmittance correcting section, the pixel value of atmospheric light, and the input image;
   wherein the transmittance correcting section divides the transmittance image into predetermined areas, performs binarization according to an average value of transmittances of each pixel in each divided predetermined area, and selects transmittances of each pixel in each predetermined area based on a number of each value binarized in each predetermined area and an average value of transmittances of each value in each predetermined area.

2. The image processing device according to claim 1, comprising a transmittance shaping section for shaping the transmittance image by multiplying a transmittance of each pixel of the transmittance image corrected in the transmittance correcting section and a transmittance of each pixel of the transmittance image generated in the transmittance image generating section, and then conducting a square root calculation of a multiplied value, wherein the fog, removal image generating section removes fog in the input image based on the transmittance image shaped in the transmittance shaping section, the pixel value of atmospheric light, and the input image.

3. The image processing device according to claim 1, comprising a range correcting section for expanding, by the arithmetic unit, a range of an input image, wherein the dark channel image generating section generates a dark channel image based on an image with a range expanded by the range correcting section, and the fog removal image generating section removes fog in the image based on the transmittance image corrected in the transmittance correcting section, the pixel value of atmospheric light, and the image with the range expanded by the range correcting section.

4. An image processing device, comprising:
   a dark channel image generating section for generating, by an arithmetic unit, a dark channel images based on an input image;
   a transmittance image generating section for generating, by the arithmetic unit, a transmittance image based on the dark channel image generated by the dark channel image generating section and a pixel value of atmospheric light;
   a transmittance correcting section for correcting, by the arithmetic unit, the transmittance image generated by the transmittance image generating section; and
   a fog removal image generating section for removing, by the arithmetic unit, fog in the input image based on the transmittance image corrected by the transmittance correcting section, the pixel of atmospheric light, and the input image;
   a range correcting section for expanding, by the arithmetic unit, a range of an input image, wherein the dark channel image generating section generated a dark channel image based on an image with a range expanded by the range correcting section, and the fog removal image generating section removes fog in the image based on the transmittance image corrected in the transmittance correcting section, the pixel value of atmospheric light, and the image with the range expanded by the range correcting section;
   wherein the range correcting section includes a first range correcting section for expanding a range of an area of the input image, a second range correcting section for dividing the input, image into a plurality of areas and expanding a range of the plurality of areas divided, and a compositing section for compositing an image with a range expanded by the first range correcting section and an image with a range expanded by the second range correcting section.

5. The image processing device according to claim 4, wherein the compositing section multiplies an image with a range expanded in the first range correcting section by a first coefficient, multiplies an image with a range expanded in the second range correcting section by a second coefficient, and adds these images.

6. The image processing device according to claim 4, wherein the second range correcting section performs an interpolation processing on an image with an expanded range.

7. An image processing method for removing fog in an image, the method comprising the steps of:
- generating, by the arithmetic unit, a dark channel image based on an input image;
- generating, by the arithmetic unit, a transmittance image based on the dark channel image generated in the step of generating the dark channel image and a pixel value of atmospheric light;
- correcting, by the arithmetic unit, the transmittance image generated hi the step of generating the transmittance image; and
- removing fog in the input image based on the transmittance image corrected in the step of correcting, the transmittance image, the pixel value of atmospheric light, and the input image;
- wherein the step of correcting the transmittance image includes: dividing the transmittance image into predetermined areas, performing binarization according to an average value of transmittances of each pixel in each divided predetermined area, and selecting transmittances of each pixel in each predetermined area based on a number of each value binarized in each predetermined area and an average value of transmittances of each value in each predetermined area.

* * * * *